United States Patent
Kiviniemi et al.

(10) Patent No.: US 10,436,672 B2
(45) Date of Patent: Oct. 8, 2019

(54) METHOD AND A SYSTEM FOR THE PURPOSE OF CONDITION MONITORING OF GEARBOXES

(71) Applicant: MOVENTAS GEARS OY, Jyväskylä (FI)

(72) Inventors: Joonas Kiviniemi, Äänekoski (FI);
Jukka Elfström, Jyväskylä (FI);
Markus Pylvänen, Jyväskylä (FI)

(73) Assignee: MOVENTAS GEARS OY, Jyväskylä (FI)

( * ) Notice: Subject to any disclaimer, the term of this patent is extended or adjusted under 35 U.S.C. 154(b) by 551 days.

(21) Appl. No.: 14/351,078

(22) PCT Filed: Oct. 4, 2012

(86) PCT No.: PCT/FI2012/050949
§ 371 (c)(1),
(2) Date: Apr. 10, 2014

(87) PCT Pub. No.: WO2013/053989
PCT Pub. Date: Apr. 18, 2013

(65) Prior Publication Data
US 2014/0257714 A1    Sep. 11, 2014

(30) Foreign Application Priority Data
Oct. 13, 2011  (EP) .................................... 11185001

(51) Int. Cl.
*G01M 13/02*    (2019.01)
*G01H 1/00*     (2006.01)
*G01M 13/021*   (2019.01)

(52) U.S. Cl.
CPC ............ *G01M 13/02* (2013.01); *G01H 1/003* (2013.01); *G01M 13/021* (2013.01)

(58) Field of Classification Search
CPC .. G01M 13/028; G01M 13/021; G01M 13/02; G01M 13/045; G01H 1/003
See application file for complete search history.

(56) References Cited

U.S. PATENT DOCUMENTS

| 5,483,833 A | 1/1996 | Dickens et al. |
| 6,053,047 A | 4/2000 | Dister et al. |

(Continued)

FOREIGN PATENT DOCUMENTS

| CN | 1926413 A | 3/2007 |
| CN | 1950687 A | 4/2007 |

(Continued)

OTHER PUBLICATIONS

Search Report issued in corresponding China Application No. 201280050529.3 dated Jan. 21, 2016 (in English).

(Continued)

*Primary Examiner* — Matthew G Marini
*Assistant Examiner* — Leo T Hinze
(74) *Attorney, Agent, or Firm* — Birch, Stewart, Kolasch & Birch, LLP

(57) ABSTRACT

A system for the purpose of condition monitoring of gearboxes includes processing equipment that is configured to receive data that contains information of a spectrum of mechanical vibrations measured from a gearbox being monitored. The processing equipment is configured to search, from the spectrum of mechanical vibrations, at least two spikes on such frequencies which correspond to a phenomenon such as for example a bearing fault. The phenomenon is defined with at least two phenomenon-specific frequencies and with reference values of amplitudes relating to these phenomenon-specific frequencies. The processing equipment is configured to form an indicator of probability of occurrence for the phenomenon on the basis of amplitudes (Continued)

of the searched spikes and the reference values of the amplitudes. The fact that the indicator is formed on the basis of amplitudes of two or more spikes which relate to this phenomenon improves the reliability of the indicator.

16 Claims, 5 Drawing Sheets

(56) References Cited

U.S. PATENT DOCUMENTS

| | | | | |
|---|---|---|---|---|
| 6,289,735 | B1* | 9/2001 | Dister | G01H 13/00 |
| | | | | 73/579 |
| 6,629,058 | B2* | 9/2003 | Komura | G01H 1/003 |
| | | | | 702/183 |
| 6,763,312 | B1* | 7/2004 | Judd | G01H 1/003 |
| | | | | 702/56 |
| 7,140,252 | B2* | 11/2006 | Hamidieh | G01M 13/028 |
| | | | | 73/162 |
| 7,184,930 | B2* | 2/2007 | Miyasaka | B61F 15/20 |
| | | | | 246/169 A |
| 7,606,673 | B2* | 10/2009 | Judd | G01H 13/00 |
| | | | | 702/56 |
| 7,640,139 | B2 | 12/2009 | Sahara et al. | |
| 7,912,659 | B2* | 3/2011 | Luo | F16H 57/01 |
| | | | | 702/35 |
| 2003/0066352 | A1 | 4/2003 | Leamy et al. | |
| 2009/0195204 | A1* | 8/2009 | Gumpert | B25D 11/00 |
| | | | | 318/460 |
| 2010/0139403 | A1 | 6/2010 | Liang et al. | |
| 2010/0256932 | A1 | 10/2010 | Kar | |
| 2010/0332186 | A1* | 12/2010 | Wilson | G06K 9/00523 |
| | | | | 702/181 |

FOREIGN PATENT DOCUMENTS

| | | |
|---|---|---|
| CN | 201740642 U | 2/2011 |
| CN | 102192825 A | 9/2011 |
| EP | 1 612 458 A2 | 1/2006 |
| JP | 2001-324380 A | 11/2001 |
| WO | WO 00/04361 A1 | 1/2000 |
| WO | WO 2005/111571 A1 | 11/2005 |
| WO | WO 2009/096551 A1 | 8/2009 |

OTHER PUBLICATIONS

Collacott, R.A., "Vibration Monitoring and Diagnosis", pp. 8-21, Academic Journal Publishing House, Oct. 31, 1988.

Office Action issued in corresponding Chinese Patent Application No. 201280050529.3 dated Sep. 27, 2016 (with partial English language translation thereof).

Office Action issued in corresponding European Patent Application No. 11185001.2 dated Apr. 4, 2017.

Canadian Office Action for Canadian Application No. 2,851,550, dated Jul. 23, 2018.

* cited by examiner

METHOD AND A SYSTEM FOR THE PURPOSE OF CONDITION MONITORING OF GEARBOXES

FIELD OF THE INVENTION

The invention relates to condition monitoring of gearboxes. More particularly, the invention relates to a system, a method, and a computer program for the purpose of condition monitoring of gearboxes.

BACKGROUND

Many techniques for gear diagnostics are based on the analysis of mechanical vibrations measured from a gearbox. The target is to detect the presence of possible faults at an early stage of development and to monitor the evolution of the faults, in order to estimate the residual life of the gearbox and/or choose an adequate plan of maintenance. The monitoring is typically based on converting the signal that represents the mechanical vibrations measured from the gearbox into the frequency domain and subsequently searching from the resulting spectrum of mechanical vibrations indications of faults. For example, publication DE19933105 discloses a method wherein an indication of a defective gear is provided when a measured spectrum deviates from a reference spectrum. The gearbox to be monitored can be, for example but not necessarily, a gearbox of a wind power station.

A monitoring arrangement comprises typically vibration sensors attached to the gearboxes to be monitored, data communications connections from the vibration sensors to a centralized monitoring station, and, in the monitoring station, processing and display equipment for processing the measured data and for displaying the spectrums of mechanical vibrations to operators who have been trained to analyze the spectrums. The monitoring arrangement may cover hundreds or even a thousand gearboxes to be monitored, and for example 20 spectrums can be measured from each gearbox per day. This would mean that even 20000 measured spectrums are to be analyzed per day. Thus, there is a clear need for methods and systems which are suitable for automated analysis and/or for pre-pruning of the measured results so as to reduce the required amount of human labor.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the first aspect of the present invention, there is provided a new system for the purpose of condition monitoring of gearboxes. The system according to the invention comprises processing equipment configured to:

receive data that contains information of at least one spectrum of mechanical vibrations measured from at least one gearbox, calculate one or more of the reference values of amplitudes relating to the phenomenon-specific frequencies on the basis of i) a power indicator that is indicative to the mechanical power transferred with the gearbox and ii) pre-stored data that defines the reference values of amplitudes as functions of the power indicator, search, from the spectrum of mechanical vibrations, at least two spikes on frequencies determined based on at least two pre-determined phenomenon-specific frequencies which correspond to a phenomenon defined with the at least two pre-determined phenomenon-specific frequencies and with reference values of amplitudes relating to these pre-determined phenomenon-specific frequencies, form an indicator of probability of occurrence for the phenomenon by comparing a) amplitudes of the searched spikes and b) the reference values of the amplitudes relating to the pre-determined phenomenon-specific frequencies, at least two of the reference values of the amplitudes being unequal to each other, and estimate the residual life of the gearbox or choose a plan of maintenance based on the indicator.

Many phenomena such as e.g. a fault in teeth of a gearwheel are manifested by more than one spike in the spectrum of mechanical vibrations measured from a gearbox. For example, there can be a main-spike and one or more smaller side-spikes in the spectrum. In the above-disclosed system, each phenomenon is defined with two or more phenomenon-specific frequencies which can be determined theoretically and/or experimentally. Furthermore, concerning for example bearing faults, the phenomenon-specific frequencies can be provided by vendors of bearings. The fact that the indicator related to a certain phenomenon is formed on the basis of amplitudes of two or more spikes which all relate to the phenomenon under consideration improves the reliability of the indicator. It is naturally possible that in addition to one or more phenomena each defined with two or more phenomenon-specific frequencies there is one or more phenomena each defined with only one phenomenon-specific frequency. Each gearbox being monitored can be either a gearbox that is integrated with another device, e.g. a generator or a motor, or a stand-alone gearbox.

In accordance with the second aspect of the present invention, there is provided a new method for the purpose of condition monitoring of gearboxes. The method according to the invention comprises:

receiving data that contains information of at least one spectrum of mechanical vibrations measured from at least one gearbox, reading, from memory, data indicative of at least two pre-determined phenomenon-specific frequencies and reference values of amplitudes relating to these pre-determined phenomenon-specific frequencies, at least two of the reference values of the amplitudes being unequal to each other, calculating one or more of the reference values of amplitudes relating to the phenomenon-specific frequencies on the basis of i) a power indicator that is indicative to the mechanical power transferred with the gearbox and ii) pre-stored data that defines the reference values of amplitudes as functions of the power indicator, searching, from the spectrum of mechanical vibrations, at least two spikes on frequencies determined based on the at least two pre-determined phenomenon-specific frequencies which correspond to a phenomenon defined with the at least two pre-determined phenomenon-specific frequencies and with the reference values of the amplitudes relating to these pre-determined phenomenon-specific frequencies, forming an indicator of probability of occurrence for the phenomenon by comparing a) amplitudes of the searched spikes and b) the reference values of the amplitudes relating to the phenomenon-specific frequencies, and estimating the residual life of the gearbox or choosing a plan of maintenance based on the indicator.

In accordance with the third aspect of the present invention, there is provided a new computer program for the purpose of condition monitoring of gearboxes. The computer program comprises computer executable instructions for controlling a programmable processor to:

receive data that contains information of at least one spectrum of mechanical vibrations measured from at least one gearbox, read, from memory, data indicative of at least two pre-determined phenomenon-specific frequencies and reference values of amplitudes relating to these pre-determined phenomenon-specific frequencies, at least two of the reference values of the amplitudes being unequal to each other, calculate one or more of the reference values of amplitudes relating to the phenomenon-specific frequencies on the basis of i) a power indicator that is indicative to the mechanical power transferred with the gearbox and ii) pre-stored data that defines the reference values of amplitudes as functions of the power indicator, search, from the spectrum of mechanical vibrations, at least two spikes on frequencies determined based on the at least two pre-determined phenomenon-specific frequencies which correspond to a phenomenon defined with the at least two pre-determined phenomenon-specific frequencies and with the reference values of the amplitudes relating to these pre-determined phenomenon-specific frequencies, form an indicator of probability of occurrence for the phenomenon by comparing a) amplitudes of the searched spikes and b) the reference values of the amplitudes relating to the phenomenon-specific frequencies, and estimate the residual life of the gearbox or choose a plan of maintenance based on the indicator.

A computer program product according to the invention comprises a non-volatile computer readable medium, e.g. a compact disc ("CD"), encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verb "to comprise" is used in this document as an open limitation that neither excludes nor requires the existence of unrecited features. The features recited in depending claims are mutually freely combinable unless otherwise explicitly stated.

BRIEF DESCRIPTION OF THE FIGURES

The exemplifying embodiments of the invention and their advantages are explained in greater detail below in the sense of examples and with reference to the accompanying drawings, in which.

DESCRIPTION OF THE EXEMPLIFYING EMBODIMENTS

Figure 1:
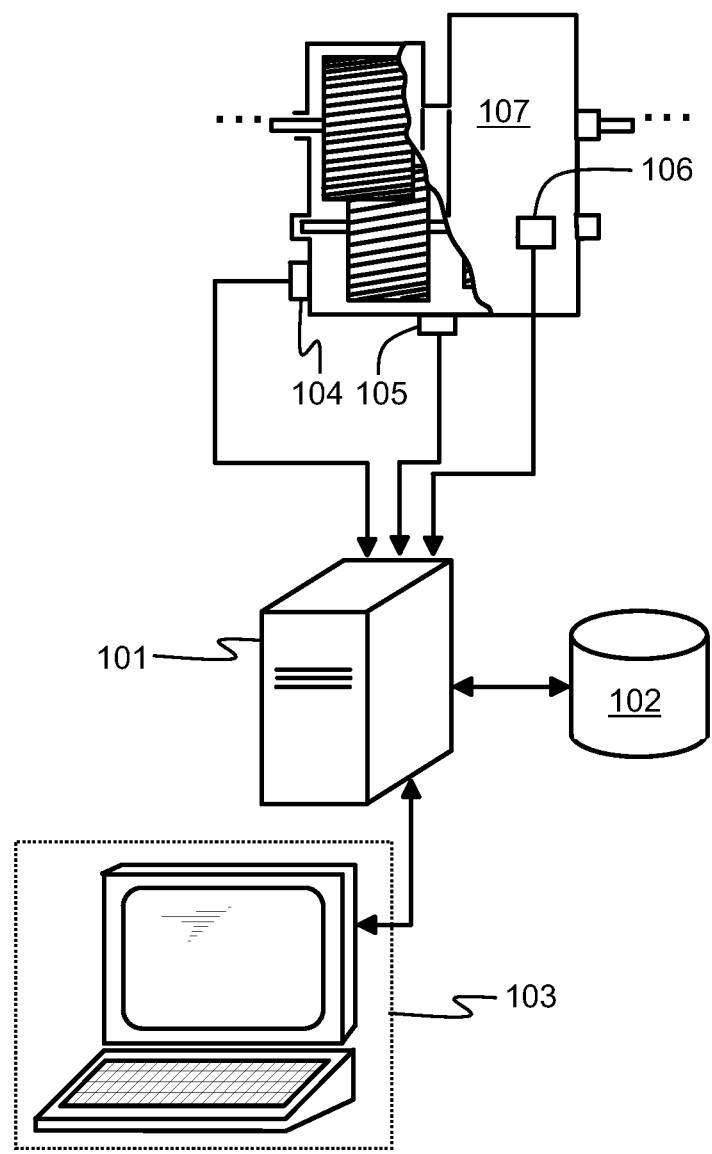
FIG. 1 illustrates a gearbox and a system according to an embodiment of the invention for condition monitoring of the gearbox.

FIG. 1 illustrates a gearbox 107 and a system according to an embodiment of the invention for condition monitoring of the gearbox. Mechanical devices connected to the input and output shafts of the gearbox are not shown in FIG. 1. The gearbox can be, for example but not necessarily, a gearbox of a wind power station wherein the gearbox is located between a wind turbine and a generator. The gearbox is provided with vibration sensors 104, 105, and 106 for measuring mechanical vibrations from different measuring points of the gearbox. Each vibration sensor may comprise means for measuring vibrations in three mutually orthogonal directions or, alternatively, there can be separate vibration sensors for different directions at some or all of the measuring points. The system for condition monitoring of the gearbox comprises processing equipment 101 that is configured to receive data that contains information of at least one spectrum of mechanical vibrations measured from the gearbox. The raw signals produced by the vibration sensors 104-106 are time domain signals representing the mechanical vibrations.

The processing equipment 101 is advantageously configured to convert the time domain signals into the frequency domain in order to obtain the spectrums of the measured mechanical vibrations. The conversion to the frequency domain can be accomplished with the Fast Fourier Transformation "FFT". It is naturally also possible that there is a separate conversion engine between the vibration sensors and the processing equipment. It is also possible that the vibration sensors 104-105 comprise integrated conversion engines.

The processing equipment 101 is configured to search, from the spectrum of mechanical vibrations, spikes on such frequencies which correspond to a phenomenon defined with at least two phenomenon-specific frequencies and with reference values of amplitudes relating to these phenomenon-specific frequencies.

The phenomenon-specific frequencies and the corresponding reference values of amplitudes represent data that is pre-stored in the processing equipment itself or in an external memory device 102. The processing equipment 101 is preferably connected to user interface equipment 103. The processing equipment 101 may comprise one or more processor units each of which can be a programmable processor unit, a dedicated hardware processor unit such as an application specific integrated circuit "ASIC", a configurable processor unit such as a field programmable gate array "FPGA", or a combination of these.

The above-mentioned spikes can be searched from the spectrum by reading the amplitudes corresponding to the phenomenon-specific frequencies and subsequently comparing these amplitudes to the background level of the mechanical vibrations. A decision that there is a spike can be made, for example, in a situation in which the amplitude is at least a pre-determined constant times the background level of the mechanical vibration. The background level can be formed by filtering the amplitudes over frequency with a sliding window average filter, with a sliding window median filter, or by using some other suitable mathematical method. The processing equipment is configured to form an indicator of probability of occurrence for the phenomenon on the basis of a) amplitudes of the searched spikes, i.e. amplitudes corresponding to the phenomenon-specific frequencies, and b) the reference values of the amplitudes relating to the phenomenon-specific frequencies. The phenomenon can be for example a static unbalance, a dynamic unbalance, an angular alignment error, a radial alignment error, a fault in the outer roller path of a bearing, a fault in the inner roller path of a bearing, a fault in the roller element of a bearing, a fault in the holder of roller elements of a bearing, a mechanical resonance, a fault in teeth of a gearwheel, or a loose fit.

The indicator of probability of occurrence can be calculated, for example, according to the following equation:

$$C = \frac{\sum_{i=1}^{N} \min\left\{\frac{A(f_i)}{A_R(f_i)}, 1\right\}}{N}. \quad (1)$$

In equation (1), C is the indicator of probability of occurrence related to the phenomenon that is possibly taking place when the spectrum of the measured mechanical vibrations contains spikes corresponding to the pre-stored phenomenon-specific frequencies $f_1, f_2, \ldots, f_N$. Hence, $f_i$ is the frequency corresponding to the i:th searched spike. $A(f_i)$ is the amplitude of the i:th searched spike and $A_R(f_i)$ is the pre-stored reference value of the amplitude of related to the i:th phenomenon-specific frequency. The pre-stored reference values $A_R(f_1), \ldots, A_R(f_N)$ of the amplitudes are preferably selected on the basis of empirical and/or theoretical information so that, when each of the amplitudes $A(f_1), \ldots, A(f_N)$ exceeds the corresponding reference value, it is in practice certain that the phenomenon is taking place. In this case, the indicator of probability of occurrence C is unity as can be seen from equation (1).

In a system according to an embodiment of the invention, the processing equipment 101 is configured to receive a power indicator that is indicative to the mechanical power transferred by the gearbox 107 and to calculate one or more of the reference values of amplitudes relating to the phenomenon-specific frequencies, i.e. $A_R(f_1), \ldots, A_R(f_N)$, on the basis of the power indicator and pre-stored data that defines the reference values of amplitudes as functions of the power indicator. The power indicator can be, for example, a measured value of the electrical output power of a generator connected to the gearbox. A reference value of amplitude is preferably an ascending function of the power indicator so that the reference value increases as the mechanical power transferred with the gearbox 107 increases. Regarding many spikes of the spectrum of mechanical vibrations, it is an inherent property that the amplitude of a spike increases as the power increases. When the gearbox is heavily loaded certain amplitudes may be normal but, on the other hand, if these amplitudes occurred during no-load or low-load conditions, it would be a strong indicator of a fault.

In order to provide an example, we consider an exemplifying case where a phenomenon is a fault and it is defined with the following frequencies $f_{fault}$, $2 \times f_{fault}$ and $3 \times f_{fault}$, and with the following reference values of the amplitudes related to these frequencies, respectively: 0.35 mm/s, 0.25 mm/s and 0.15 mm/s. Next we assume that there are spikes in the spectrum of the measured mechanical vibrations corresponding to frequencies $f_{fault}$ and $2 \times f_{fault}$ so that the amplitudes of these spikes are 0.40 mm/s and 0.10 mm/s, respectively. Furthermore we assume that there is no spike, i.e. the background level is not exceeded, corresponding to the frequency $3 \times f_{fault}$. Substituting these numerical values to equation (1) we get the indicator of probability of occurrence C≈0.47. Different values of the indicator of probability of occurrence can be classified on the basis of empirical data. The classification can be, for example, as follows:

no fault when C<0.6,
an incipient fault when 0.6≤C<1, and
a fault when C=1.

The processing equipment 101 is preferably configured to handle two or more phenomena simultaneously. In this case, the processing equipment 101 is configured to search, from the spectrum of mechanical vibrations, spikes on such two or more sets of frequencies which correspond to two or more phenomena each of which being defined with at least two phenomenon-specific frequencies and with reference values of amplitudes relating to the phenomenon-specific frequencies. The processing equipment 101 is configured to form, for each of the at least two phenomena, the indicator of probability of occurrence on the basis of a) amplitudes of the searched spikes corresponding to that phenomenon and b) the reference values of the amplitudes relating to these phenomenon-specific frequencies.

In a system according to an embodiment of the invention, the processing equipment 101 is configured to arrange the phenomenon-specific frequencies and the spectrum of mechanical vibrations to correspond to each other with the aid of rotational speed related to the spectrum of mechanical vibrations and a reference rotational speed related to the phenomenon-specific frequencies. This is needed in cases where the rotational speed of the gearbox 107 during the measurement of the mechanical vibrations differs from the reference rotational speed corresponding to the pre-stored phenomenon-specific frequencies. The processing equipment 101 is preferably configured to receive a measured rotational speed of the gearbox together with the information about the mechanical vibrations. The processing equipment 101 can be further configured to search, from the spectrum of mechanical vibrations, a reference spike whose frequency is, according to a known theory, a known integer or rational number times the rotational speed of the gearbox. For example, the meshing frequency of two interoperating gearwheel is a known rational number times the rotational speed. The value of the measured rotational speed can be fine-tuned with the aid of the frequency of the reference spike and the known integer or rational number.

The phenomenon-specific frequencies can be converted to correspond to the spectrum of mechanical vibrations by multiplying a first sub-set of the phenomenon-specific frequencies with a ratio of the rotational speed and the reference rotational speed. The first sub-set of the phenomenon-specific frequencies are such frequencies that are proportional to the rotational speed and at least part of the rest of the phenomenon-specific frequencies are frequencies of mechanical resonances which are not proportional to the rotation speed. Alternatively, the spectrum of mechanical vibrations can be converted to correspond to the phenomenon-specific frequencies by multiplying a first sub-set of frequencies of the spectrum of mechanical vibrations with a ratio of the reference rotational speed and the rotational speed. The first sub-set of the frequencies of the spectrum of mechanical vibrations are such frequencies that are proportional to the rotational speed and at least part of the rest of the frequencies of the spectrum of mechanical vibrations are frequencies of the mechanical resonances. In the conversions, it should be taken into account that amplitudes, when expressed as speed, e.g. as mm/s, or as acceleration, e.g. as mm/s$^2$, are also scaled when the rotational speed is changed if the amplitude expressed as displacement, e.g. as mm, is same at different rotational speeds.

In a system according to an embodiment of the invention, the processing equipment 101 is configured to carry out the following actions a)-e) in order to search spikes from the spectrum of mechanical vibrations:
 a) selecting a frequency-band that covers the phenomenon-specific frequencies related to the phenomenon under consideration,
 b) forming a time domain signal that corresponds to the part of the spectrum of mechanical vibrations that belongs to the selected frequency band,
 c) rectifying the time domain signal with e.g. squaring or forming an absolute value,
 d) converting the rectified time domain signal into frequency domain with the Fourier transformation, e.g. FFT, so as to form an auxiliary spectrum, and
 e) searching the at least two spikes from the auxiliary spectrum.

The above-mentioned time domain signal can be formed either by band-pass filtering the measured mechanical vibration signal in the time-domain or by cutting from the spectrum of mechanical vibrations the part that corresponds to the selected frequency band and subsequently converting this part of the spectrum into the time-domain with the inverse Fourier transformation, e.g. IFFT.

The above-mentioned auxiliary spectrum represents an envelope spectrum from which weak spikes representing incipient faults are easier to detect than from the original spectrum of mechanical vibrations.

In a system according to an embodiment of the invention, the processing equipment 101 is configured to carry out the following actions a)-f) in order to form an interestingness figure L:
 a) computing a total vibration level from the spectrum of mechanical vibrations, where the total vibration level can be e.g. the root-mean-square "RMS" value of the vibration represented by the whole spectrum
 b) setting the interestingness figure L to be the total vibration level,
 c) extracting, from the spectrum of mechanical vibrations, spikes that are unknown in the sense that they do not correspond to any of the phenomenon-specific frequencies relating to the phenomena under consideration,
 d) adding, to the interestingness figure L, a value that depends on the number of the unknown spikes,
 e) for each unknown spike, adding, to the interestingness figure L, a value that depends on the ratio of that unknown spike and background vibration level prevailing in the frequency domain in the surroundings of that unknown spike, where the background vibration level can be formed by filtering the amplitudes over frequency with a sliding window average filter, with a sliding window median filter, or by using some other suitable mathematical method, and
 f) for each phenomenon under consideration, adding, to the interestingness figure L, a value that depends on the indicator of the probability of occurrence related to that phenomenon.

The interestingness figure L is a single number which can be used, for example, for indicating whether or not the spectrum of mechanical vibrations is worth further attention.

In a system according to an embodiment of the invention, the processing equipment 101 is configured to compare the interestingness figure L with an interestingness figure $L_{earlier}$ formed earlier for the same gearbox so as to derive information about the trend of the interestingness figure. The comparison can be accomplished, for example, by calculating a difference of the interestingness figures being compared, by calculating a ratio of the interestingness figures being compared, or by using some other suitable mathematical method. The interestingness figures corresponding to different time instants can also be presented as a curve on a display screen so as to enable an operator to monitor the evolution of the interestingness figure.

In a system according to an embodiment of the invention, the processing equipment 101 is configured to compare the interestingness figure L with a corresponding interestingness figure $L_{other}$ formed for another gearbox that is identical and operates under similar conditions so as to derive information about differences between the gearbox and the other gearbox.

Figure 2A:
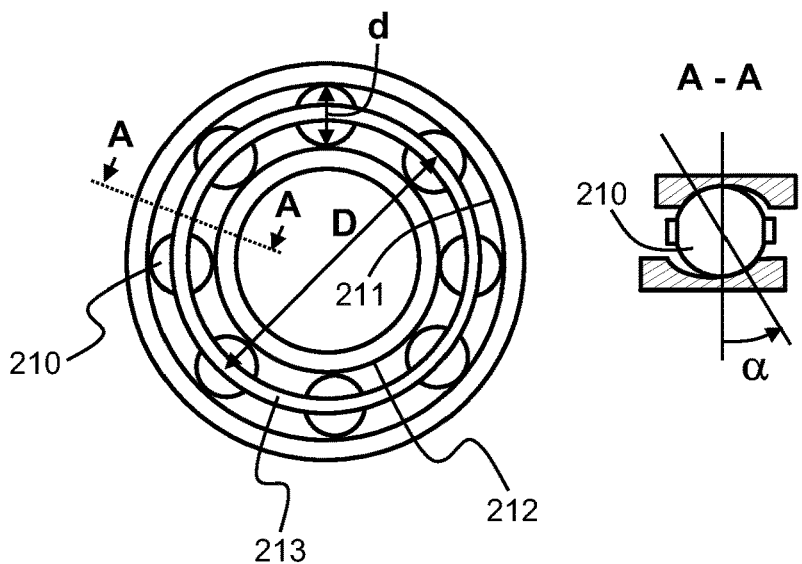
FIG. 2a illustrates definitions of parameters that can be used in systems and methods according to some embodiments of the invention.

In order to provide an example, we consider some faults which may take place in a ball bearing shown in FIG. 2a. We assume that the outer ring of the bearing is stationary and the inner ring rotates $f_R$ revolutions per second. When there is a fault in the outer roller path 211 of the bearing, an estimate for the frequency of the vibration caused by this fault can be calculated with the following known equation:

$$f_{outer} = \frac{n}{2}\left(1 - \frac{d}{D}\cos\alpha\right)f_R, \qquad (2)$$

where n is the number of the balls of the bearing, D is the distance between the middle points of balls in opposite sides of the bearing as illustrated in FIG. 2a, d is the diameter of the balls as illustrated in FIG. 2a, and α is the contact angle of the balls as illustrated in the cross-section A-A shown in FIG. 2a.

When there is a fault in the inner roller path 212 of the bearing, an estimate for the frequency of the vibration caused by this fault can be calculated with the following known equation:

$$f_{inner} = \frac{n}{2}\left(1 + \frac{d}{D}\cos\alpha\right)f_R. \qquad (3)$$

When there is a fault in a ball 210 of the bearing, an estimate for the frequency of the vibration caused by this fault can be calculated with the following known equation:

$$f_{ball} = \frac{D}{2d}\left(1 - \left(\frac{d}{D}\cos\alpha\right)^2\right)f_R. \qquad (4)$$

When there is a fault in the holder 213 of the balls of the bearing, an estimate for the frequency of the vibration caused by this fault can be calculated with the following known equation:

$$f_{holder} = \frac{1}{2}\left(1 - \frac{d}{D}\cos\alpha\right)f_R. \quad (5)$$

Figure 2B:
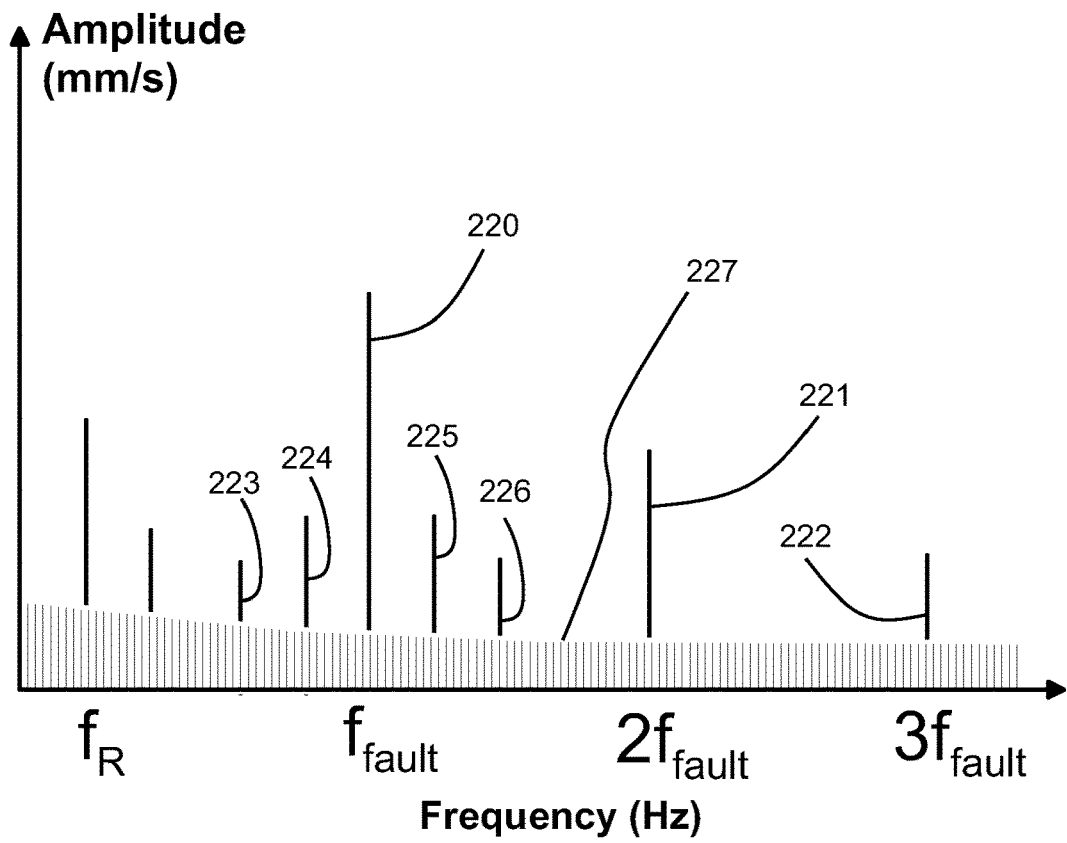
FIGS. 2b-2d illustrates exemplifying spectrums of mechanical vibrations.

FIG. 2b shows a schematic illustration of a spectrum of mechanical vibrations when there is a fault in a bearing. The frequency $f_{fault}$ shown in FIG. 2b can be, for example, one of the above-mentioned frequencies: $f_{outer}$, $f_{inner}$, $f_{ball}$, or $f_{holder}$. In the spectrum, a spike 220 represents the fundamental vibration component caused by the bearing fault and spikes 221 and 222 represents the second and third harmonics of the fundamental vibration component, respectively. Spikes 223, 224, 225 and 226 are side-spikes of the fundamental vibration component. The side-spikes 223-226 are caused by inter-modulation between the fundamental vibration component and vibrations at the frequency $f_R$ that represents the rotational speed. Furthermore, the spectrum contains a spike at the frequency $f_R$ and at its harmonics, and a background vibration 227. A phenomenon that represents the bearing fault can be defined, for example, with frequencies of the spikes 220-222, i.e. $f_{fault}$, $2f_{fault}$ and $3f_{fault}$, and with reference values of the amplitudes of these spikes. In some cases, also the frequencies of some of the side-spikes, i.e. $f_{fault} \pm \text{integer} \times f_R$, and reference values of the corresponding amplitudes can be included into the definition of the bearing fault. The bearing fault can be more reliably detected and/or an indicator for the reliability of the detection can be formed when the bearing fault is detected on the basis of many spikes instead of only inspecting the existence and amplitude of the spike at $f_{fault}$.

Figure 2C:
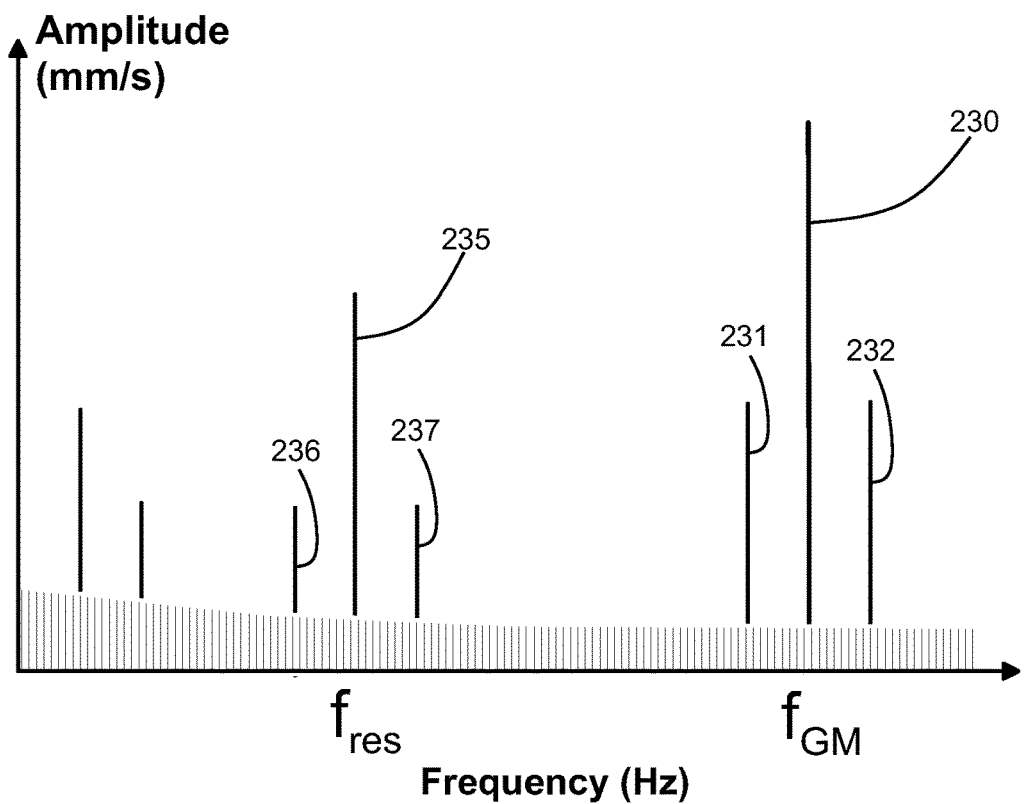

For providing another example, FIG. 2c shows a schematic illustration of a spectrum of mechanical vibrations when the teeth of gearwheels have been worn. The worn teeth cause increase in the spike 230 at the meshing frequency $f_{GM}$ of the gearwheels and in the side-spikes 231 and 232 that are caused by inter-modulation between the meshing frequency component and vibrations corresponding to the rotational speed of the input or output gearwheel. Furthermore, the vibration caused by the worn gearwheels may wake-up resonance vibrations in the output gearwheel and/or in other mechanical structures of the gearbox. In the spectrum shown in FIG. 2b, a spike 235 represents resonance vibration. The spike 235 may have side-spikes 236 and 237 caused by inter-modulation between the resonance vibration and the vibrations corresponding to the rotational speed of the input or output gearwheel.

In a system according to an embodiment of the invention, the processing equipment 101 is configured to compare the shape of the spectrum of mechanical vibrations with a pre-stored shape that is indicative of unreliability in the measurement of the spectrum of mechanical vibrations. The shape of the spectrum can be compared with the pre-stored shape for example in the following way. The spectrum of mechanical vibrations is presented as an N-dimensional vector s so that $i^{th}$ element of s is the amplitude at the $i^{th}$ frequency point, where $i=1, \ldots, N$. Correspondingly, the pre-stored shape is presented as an N-dimensional vector p so that $i^{th}$ element of p is the amplitude corresponding to the pre-stored shape at the $i^{th}$ frequency point. Next, a parameter $\beta$ is determined so that a vector norm of the difference vector $s-\beta p$ is minimized. The vector norm can be, for example, the square norm $\sqrt{[(s-\beta p)^T(s-\beta p)]}$ that is known from the basic mathematics. The minimized value of the vector norm can be used as an indicator of how close the shape of the spectrum of mechanical vibrations is to the pre-stored shape. It should be noted that the above-presented mathematical method is only a single example, and there are many other mathematical methods that can be used for comparing the shape of the spectrum of mechanical vibrations with the pre-stored shape.

Figure 2D:
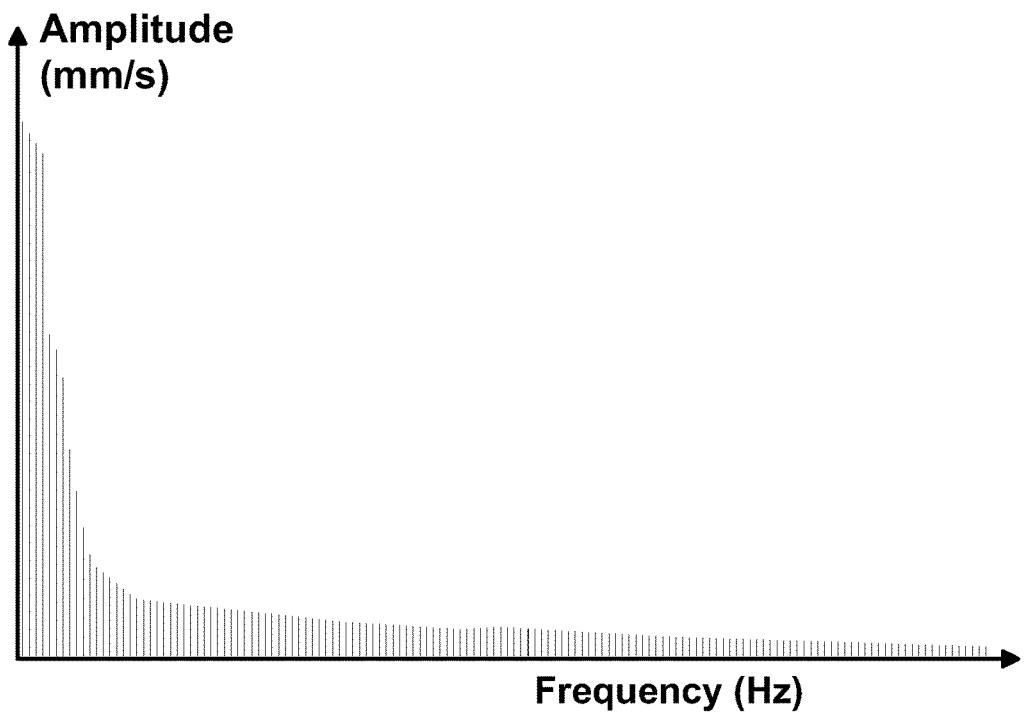

The pre-stored shape can be, for example, such that it represents the so-called ski-slope phenomenon which typically takes place when there are problems with a vibration sensor and/or the vibrations sensor is subject to so strong mechanical vibrations that it is not able to produce reliable measurement results. The ski-slope phenomenon is characterized in that the amplitude is strong at low frequencies and the amplitude decreases strongly with increasing frequency at low frequencies and slowly at higher frequencies. FIG. 2d illustrates the shape of the spectrum when the ski-slope phenomenon takes place.

Figure 3:
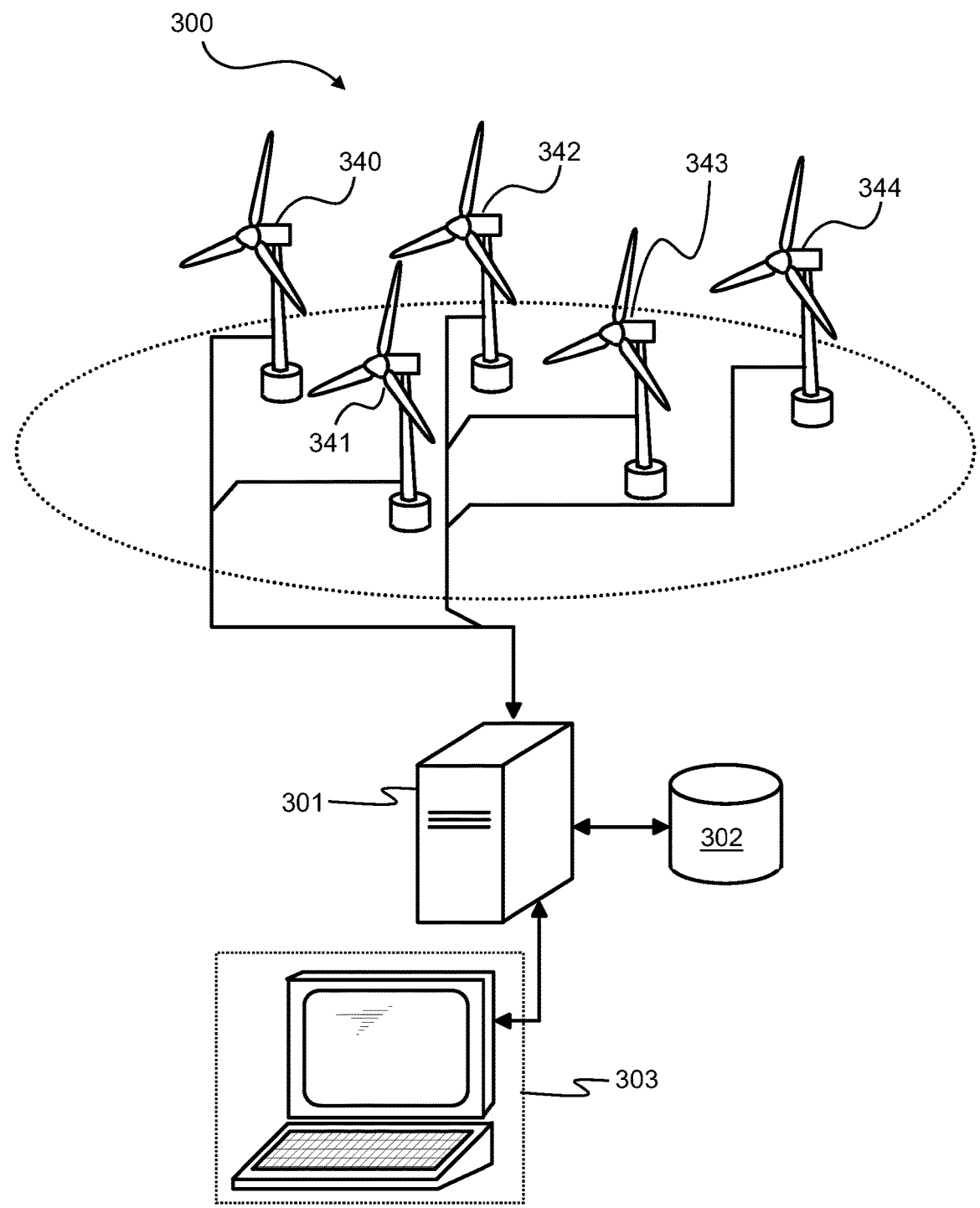
FIG. 3 illustrates a wind farm provided with a system according to an embodiment of the invention for condition monitoring of gearboxes of the wind farm.

FIG. 3 illustrates a wind farm 300 provided with a system according to an embodiment of the invention for condition monitoring of gearboxes of the wind farm. The gearboxes are located in the nacelles 340, 341, 342, 343, and 344 of the wind power stations of the wind farm. The gearboxes are provided with vibration sensors for measuring mechanical vibrations of the gearboxes. The system for condition monitoring of the gearboxes comprises processing equipment 301 that is configured to receive data that contains information of spectrums of mechanical vibrations measured from the gearboxes. The processing equipment 301 is configured to search, from each spectrum of mechanical vibrations, spikes on such frequencies which correspond to phenomena under consideration. Each of the phenomena is defined with at least two phenomenon-specific frequencies and with reference values of amplitudes relating to these phenomenon-specific frequencies. The processing equipment 301 is configured to form, for each phenomenon under consideration, an indicator of probability of occurrence on the basis of a) amplitudes of the searched spikes relating to that phenomenon and b) the reference values of the amplitudes.

All the gearboxes of the wind farm 300 are not necessarily similar to each other. In a system according to an embodiment of the invention, the processing equipment 301 is configured to select, from a library of phenomena that contains data relating to several types of gearboxes, a sub-set of the data that relates to the gearbox under consideration. The selected sub-set of the data contains the phenomenon-specific frequencies and reference values of amplitudes relating to the phenomenon-specific frequencies for the gearbox under consideration. The library of phenomena can be stored in an external memory device 302, or the processing device itself may comprise a sufficient amount of memory for storing the library of phenomena.

In a system according to an embodiment of the invention, the processing equipment 301 is configured to compare the indicator of probability of occurrence with a corresponding indicator of probability of occurrence formed earlier and under similar conditions for the same gearbox so as to derive information about a trend of the phenomenon related to the indicator of probability of occurrence. The trend information can be used for detecting the presence of possible faults at an early stage of development.

In a system according to an embodiment of the invention, the processing equipment 301 is configured to compare the indicator of probability of occurrence with a corresponding indicator of probability of occurrence formed for another gearbox that is identical and operates under similar conditions so as to derive information about differences between the gearbox and the other gearbox. The difference information can be used for detecting the presence of possible faults at an early stage of development.

Figure 4:
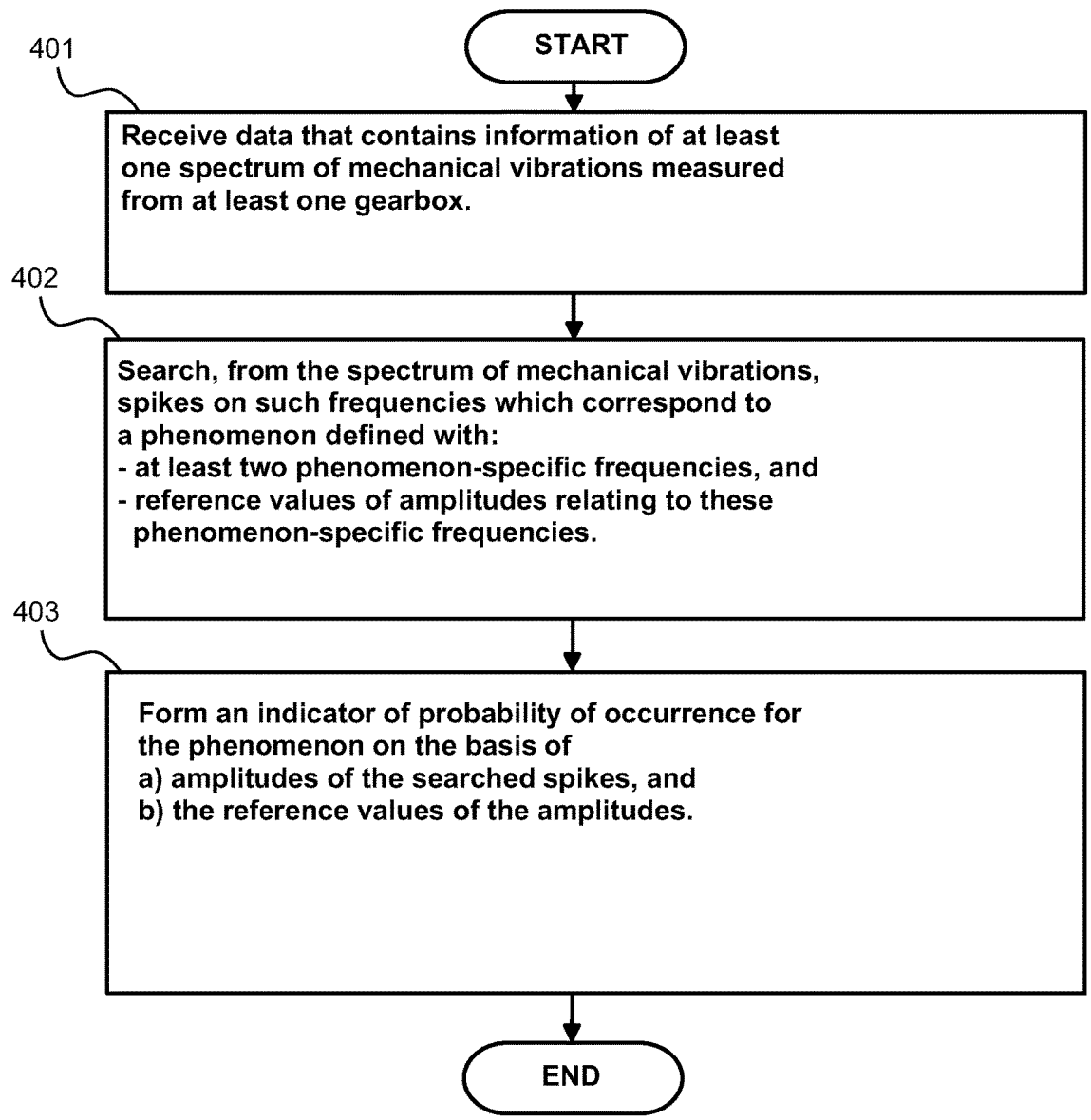
FIG. 4 shows a flow chart of a method according to an embodiment of the invention for the purpose of condition monitoring of gearboxes.

FIG. 4 shows a flow chart of a method according to an embodiment of the invention for the purpose of condition monitoring of gearboxes. The method comprises:
- action 401: receiving data that contains information of at least one spectrum of mechanical vibrations measured from at least one gearbox,
- action 402: searching, from the spectrum of mechanical vibrations, at least two spikes on such frequencies which correspond to a phenomenon defined with at least two phenomenon-specific frequencies and with reference values of amplitudes relating to these phenomenon-specific frequencies, and
- action 403: forming an indicator of probability of occurrence for the phenomenon on the basis of a) amplitudes of the searched spikes and b) the reference values of the amplitudes relating to the phenomenon-specific frequencies.

A method according to an embodiment of the invention comprises:
- searching, from the spectrum of mechanical vibrations, spikes on such at least two sets of frequencies which correspond to two or more phenomena each of which being defined with at least two phenomenon-specific frequencies and with reference values of amplitudes relating to the phenomenon-specific frequencies, and
- forming, for each of the at least two phenomena, the indicator of probability of occurrence on the basis of a) amplitudes of the searched spikes corresponding to that phenomenon and b) the reference values of the amplitudes relating to these phenomenon-specific frequencies.

Each phenomenon under consideration can be for example a static unbalance, a dynamic unbalance, an angular alignment error, a radial alignment error, a fault in the outer roller path of a bearing, a fault in the inner roller path of a bearing, a fault in the roller element of a bearing, a fault in the holder of roller elements of a bearing, a mechanical resonance, a fault in teeth of a gearwheel, or a loose fit.

A method according to an embodiment of the invention comprises arranging the phenomenon-specific frequencies and the spectrum of mechanical vibrations to correspond to each other with the aid of rotational speed related to the spectrum of mechanical vibrations and a reference rotational speed related to the phenomenon-specific frequencies.

A method according to an embodiment of the invention comprises converting the phenomenon-specific frequencies to correspond to the spectrum of mechanical vibrations by multiplying a first sub-set of the phenomenon-specific frequencies with a ratio of the rotational speed and the reference rotational speed. The first sub-set of the phenomenon-specific frequencies contains frequencies that are proportional to the rotational speed and at least part of the rest of the phenomenon-specific frequencies are frequencies of mechanical resonances.

A method according to an embodiment of the invention comprises converting the spectrum of mechanical vibrations to correspond to the phenomenon-specific frequencies by multiplying a first sub-set of frequencies of the spectrum of mechanical vibrations with a ratio of the reference rotational speed and the rotational speed. The first sub-set of the frequencies of the spectrum of mechanical vibrations contains frequencies that are proportional to the rotational speed and at least part of the rest of the frequencies of the spectrum of mechanical vibrations are frequencies of mechanical resonances.

A method according to an embodiment of the invention comprises selecting, from a library of phenomena that contains data relating to several types of gearboxes, a sub-set of the data that relates to the gearbox under consideration. The selected sub-set of the data contains the phenomenon-specific frequencies and reference values of amplitudes relating to the phenomenon-specific frequencies.

A method according to an embodiment of the invention comprises comparing the indicator of probability of occurrence with a corresponding indicator of probability of occurrence formed earlier and under similar conditions for the same gearbox so as to derive information about a trend of the phenomenon related to the indicator of probability of occurrence.

A method according to an embodiment of the invention comprises comparing the indicator of probability of occurrence with a corresponding indicator of probability of occurrence formed for another gearbox that is identical and operates under similar conditions so as to derive information about differences between the gearbox and the other gearbox.

A method according to an embodiment of the invention comprises the following actions in order to search, from the spectrum of mechanical vibrations, the at least two spikes:
- selecting a frequency-band that covers the phenomenon-specific frequencies related to the phenomenon under consideration,
- forming a time domain signal that corresponds to the part of the spectrum of mechanical vibrations that belongs to the selected frequency band,
- rectifying the time domain signal,
- converting the rectified time domain signal into frequency domain so as to form an auxiliary spectrum, and
- searching the at least two spikes from the auxiliary spectrum.

A method according to an embodiment of the invention comprises comparing the shape of the spectrum of mechanical vibrations with a pre-stored shape that is indicative of unreliability in the measurement of the spectrum of mechanical vibrations.

A method according to an embodiment of the invention comprises receiving a measured rotational speed of the gearbox, the measured rotational speed representing the rotational speed related to the spectrum of mechanical vibrations.

A method according to an embodiment of the invention comprises:
- searching, from the spectrum of mechanical vibrations, a reference spike whose frequency is, according to a known theory, a known integer or rational number times the rotational speed of the gearbox, and
- correcting the rotational speed related to the spectrum of mechanical vibrations with the aid of the frequency of the reference spike and the known integer or rational number.

A method according to an embodiment of the invention comprises forming, for each phenomenon under consideration, the indicator of probability of occurrence according to the equation:

$$C = \frac{\sum_{i=1}^{N} \min\left\{\frac{A(f_i)}{A_R(f_i)}, 1\right\}}{N},$$

where C is the indicator of probability of occurrence, $f_i$ is the frequency of the i:th searched spike, $A(f_i)$ is the amplitude of the i:th searched spike, $A_R(f_i)$ is the reference value of the amplitude of related to the i:th phenomenon-specific frequency, and N is the number of the phenomenon-specific frequencies.

A method according to an embodiment of the invention comprises the following actions in order to form an interestingness figure:
- computing a total vibration level from the spectrum of mechanical vibrations,
- setting the interestingness figure to be the total vibration level,
- extracting, from the spectrum of mechanical vibrations, spikes that are unknown in the sense that they do not correspond to any of the phenomenon-specific frequencies,
- adding, to the interestingness figure, a value that depends on the number of the unknown spikes,
- for each unknown spike, adding, to the interestingness figure, a value that depends on the ratio of that unknown spike and background vibration level prevailing in the frequency domain in the surroundings of that unknown spike, and
- for each phenomenon under consideration, adding, to the interestingness figure, a value that depends on the indicator of the probability of occurrence related to that phenomenon.

A method according to an embodiment of the invention comprises comparing the interestingness figure with an interestingness figure formed earlier for the same gearbox so as to derive information about the trend of the interestingness figure.

A method according to an embodiment of the invention comprises comparing the interestingness figure with a corresponding interestingness figure formed for another gearbox that is identical and operates under similar conditions so as to derive information about differences between the gearbox and the other gearbox.

A method according to an embodiment of the invention comprises calculating one or more of the reference values of amplitudes relating to the phenomenon-specific frequencies on the basis of a power indicator that is indicative to the mechanical power transferred by the gearbox and pre-stored data that defines the reference values of amplitudes as functions of the power indicator.

A computer program according to an embodiment of the invention comprises software modules for the purpose of condition monitoring of gearboxes. The software modules comprise computer executable instructions for controlling a programmable processor to:
- receive data that contains information of at least one spectrum of mechanical vibrations measured from at least one gearbox,
- search, from the spectrum of mechanical vibrations, at least two spikes on such frequencies which correspond to a phenomenon defined with at least two phenomenon-specific frequencies and with reference values of amplitudes relating to these phenomenon-specific frequencies, and
- form an indicator of probability of occurrence for the phenomenon on the basis of a) amplitudes of the searched spikes and b) the reference values of the amplitudes relating to the phenomenon-specific frequencies.

The software modules can be, for example, subroutines and functions generated with a suitable programming language.

A computer program product according to an embodiment of the invention comprises a non-volatile computer readable medium, e.g. a compact disc ("CD"), encoded with a computer program according to an embodiment of the invention.

A signal according to an embodiment of the invention is encoded to carry information defining a computer program according to an embodiment of the invention.

The specific examples provided in the description given above should not be construed as limiting. Therefore, the invention is not limited merely to the embodiments described above.

What is claimed is:

1. A system comprising:
   at least one gearbox;
   at least one vibration sensor for measuring mechanical vibrations from at least one measuring point of at least one gearbox;
   processing equipment configured to receive data from the at least one vibration sensor that contains information of at least one spectrum of mechanical vibrations measured from the at least one measuring point of the at least one gearbox, and
   a memory configured to store data indicative of at least two pre-determined phenomenon-specific frequencies and reference values of amplitudes relating to the pre-determined phenomenon-specific frequencies,
   wherein:
   the processing equipment is configured to calculate one or more of the reference values of amplitudes relating to the phenomenon-specific frequencies by comparing i) a power indicator that is indicative to the mechanical power transferred with the gearbox and ii) pre-stored data that defines the reference values of amplitudes as functions of the power indicator,
   the processing equipment is configured to search, from the spectrum of mechanical vibrations, at least two spikes on frequencies determined based on the at least two pre-determined phenomenon-specific frequencies which correspond to a phenomenon defined with at least two phenomenon-specific frequencies and with reference values of amplitudes relating to these phenomenon-specific frequencies,
   the processing equipment is configured to form an indicator of probability of occurrence for the phenomenon by comparing a) amplitudes of each of the at least two searched spikes and b) the reference values of the amplitudes relating to the phenomenon-specific frequencies, at least two of the reference values of the amplitudes being unequal to each other,
   the processing equipment is configured to estimate the residual life of the gearbox or choose a plan of maintenance based on the indicator, and
   wherein the phenomenon is one of a static unbalance, a dynamic unbalance, an angular alignment error, a radial alignment error, a fault in the outer roller path of a bearing, a fault in the inner roller path of a bearing, a fault in the roller element of a bearing, a fault in the holder of roller elements of a bearing, a mechanical resonance, a fault in teeth of a gearwheel, and a loose fit.

2. A system according to claim 1, wherein:
   the processing equipment is configured to search, from the spectrum of mechanical vibrations, spikes on such at least two sets of frequencies which correspond to two or more phenomena each of which being defined with at least two phenomenon-specific frequencies and with reference values of amplitudes relating to the phenomenon-specific frequencies, and the processing equipment is configured to form, for each of the at least two phenomena, the indicator of probability of occurrence by comparing a) amplitudes of the searched spikes corresponding to that phenomenon and b) the reference values of the amplitudes relating to these phenomenon-specific frequencies.

3. A system according to claim 1, wherein the processing equipment is configured to arrange the phenomenon-specific frequencies and the spectrum of mechanical vibrations to correspond to each other with the aid of rotational speed related to the spectrum of mechanical vibrations and a reference rotational speed related to the phenomenon-specific frequencies.

4. A system according to claim 3, wherein the processing equipment is configured to convert the phenomenon-specific frequencies to correspond to the spectrum of mechanical vibrations by multiplying a first sub-set of the phenomenon-specific frequencies with a ratio of the rotational speed and the reference rotational speed, the first sub-set of the phenomenon-specific frequencies being frequencies that are proportional to the rotational speed and at least part of the rest of the phenomenon-specific frequencies being frequencies of mechanical resonances.

5. A system according to claim 3, wherein the processing equipment is configured to convert the spectrum of mechanical vibrations to correspond to the phenomenon-specific frequencies by multiplying a first sub-set of frequencies of the spectrum of mechanical vibrations with a ratio of the reference rotational speed and the rotational speed, the first sub-set of the frequencies of the spectrum of mechanical vibrations being frequencies that are proportional to the rotational speed and at least part of the rest of the frequencies of the spectrum of mechanical vibrations being frequencies of mechanical resonances.

6. A system according to claim 3, wherein the processing equipment is configured to receive a measured rotational speed of the gearbox, the measured rotational speed representing the rotational speed related to the spectrum of mechanical vibrations.

7. A system according to claim 6, wherein:
the processing equipment is configured to search, from the spectrum of mechanical vibrations, a reference spike whose frequency is a known integer or rational number times the rotational speed of the gearbox, and
the processing equipment is configured to correct the rotational speed related to the spectrum of mechanical vibrations with the aid of the frequency of the reference spike and the known integer or rational number.

8. A system according to claim 1, wherein the processing equipment is configured to select, from a library of phenomena that contains data relating to several types of gearboxes, a sub-set of the data that relates to the gearbox under consideration, the sub-set of the data containing the phenomenon-specific frequencies and reference values of amplitudes relating to the phenomenon-specific frequencies.

9. A system according to claim 1, wherein:
the processing equipment is configured to select a frequency-band that covers the phenomenon-specific frequencies related to the phenomenon under consideration,
the processing equipment is configured to form a time domain signal that corresponds to a part of the spectrum of mechanical vibrations that belongs to the selected frequency band,
the processing equipment is configured to rectify the time domain signal, the processing equipment is configured to convert the rectified time domain signal into frequency domain so as to form an auxiliary spectrum, and
the processing equipment is configured to search the at least two spikes from the auxiliary spectrum.

10. A system according to claim 1, wherein the processing equipment is configured to compare the shape of the spectrum of mechanical vibrations with a pre-stored shape that is indicative of unreliability in the measurement of the spectrum of mechanical vibrations.

11. A system according to claim 1, wherein the processing equipment is configured to form, for each phenomenon under consideration, the indicator of probability of occurrence according to the equation:

$$C = \frac{\sum_{i=1}^{N} \min\left\{\frac{A(f_i)}{A_R(f_i)}, 1\right\}}{N},$$

where C is the indicator of probability of occurrence, $f_i$ is the frequency of the i:th searched spike, $A(f_i)$ is the amplitude of the i:th searched spike, $A_R(f_i)$ is the reference value of the amplitude of related to the i:th phenomenon-specific frequency, and N is the number of the phenomenon-specific frequencies.

12. A system according to claim 1, wherein:
the processing equipment is configured to compute a total vibration level from the spectrum of mechanical vibrations,
the processing equipment is configured to set an interestingness figure to be the total vibration level, the interestingness figure being a single number,
the processing equipment is configured to extract, from the spectrum of mechanical vibrations, spikes that are unknown in the sense that they do not correspond to any of the phenomenon-specific frequencies,
the processing equipment is configured to add, to the interestingness figure, a value that depends on the number of the unknown spikes,
the processing equipment is configured to add to the interestingness figure, for each unknown spike, a value that depends on the ratio of that unknown spike and background vibration level prevailing in the frequency domain in the surroundings of that unknown spike, and
the processing equipment is configured to add to the interestingness figure, for each phenomenon under consideration, a value that depends on the indicator of the probability of occurrence related to that phenomenon.

13. A system according to claim 12, wherein the processing equipment is configured to compare the interestingness figure with an interestingness figure formed earlier for the same gearbox so as to derive information about a trend of the interestingness figure.

14. A system according to claim 12, wherein the processing equipment is configured to compare the interestingness figure with a corresponding interestingness figure formed for another gearbox that is identical and operates under similar conditions so as to derive information about differences between the gearbox and the other gearbox.

15. A method comprising:
measuring mechanical vibrations from at least one measuring point of at least one gearbox with at least one vibration sensor;

receiving data that contains information of at least one spectrum of mechanical vibrations measured from the at least one measuring point of the at least one gearbox, reading, from memory, data indicative of at least two pre-determined phenomenon-specific frequencies and reference values of amplitudes relating to the pre-determined phenomenon-specific frequencies, calculating one or more of the reference values of amplitudes relating to the phenomenon-specific frequencies by comparing i) a power indicator that is indicative to the mechanical power transferred with the gearbox and ii) pre-stored data that defines the reference values of amplitudes as functions of the power indicator, searching, from the spectrum of mechanical vibrations, at least two spikes on frequencies determined based on the at least two pre-determined phenomenon-specific frequencies which correspond to a phenomenon defined with at least two pre-determined phenomenon-specific frequencies and with reference values of amplitudes relating to these phenomenon-specific frequencies, at least two of the reference values of the amplitudes being unequal to each other, foaming an indicator of probability of occurrence for the phenomenon by comparing a) amplitudes of each of the at least two searched spikes and b) the reference values of the amplitudes relating to the phenomenon-specific frequencies, and estimating the residual life of the gearbox or choosing a plan of maintenance based on the indicator, wherein the phenomenon is one of the following: a static unbalance, a dynamic unbalance, an angular alignment error, a radial alignment error, a fault in the outer roller path of a bearing, a fault in the inner roller path of a bearing, a fault in the roller element of a bearing, a fault in the holder of roller elements of a bearing, a mechanical resonance, a fault in teeth of a gearwheel, and a loose fit.

16. A non-transitory computer readable medium encoded with a computer program comprising computer executable instructions for controlling a programmable processor to:

receive data that contains information of at least one spectrum of mechanical vibrations measured from at least one gearbox by at least one vibration sensor, read, from memory, data indicative of at least two pre-determined phenomenon-specific frequencies and reference values of amplitudes relating to the pre-determined phenomenon-specific frequencies, calculate one or more of the reference values of amplitudes relating to the phenomenon-specific frequencies by comparing i) a power indicator that is indicative to the mechanical power transferred with the gearbox and ii) pre-stored data that defines the reference values of amplitudes as functions of the power indicator, search, from the spectrum of mechanical vibrations, at least two spikes on frequencies determined based on the at least two pre-determined phenomenon-specific frequencies which correspond to a phenomenon defined with at least two pre-determined phenomenon-specific frequencies and with reference values of amplitudes relating to these phenomenon-specific frequencies, at least two of the reference values of the amplitudes being unequal to each other, form an indicator of probability of occurrence for the phenomenon by comparing a) amplitudes of each of the at least two searched spikes and b) the reference values of the amplitudes relating to the phenomenon-specific frequencies, and estimate the residual life of the gearbox or choose a plan of maintenance based on the indicator, wherein the phenomenon is one of the following: a static unbalance, a dynamic unbalance, an angular alignment error, a radial alignment error, a fault in the outer roller path of a bearing, a fault in the inner roller path of a bearing, a fault in the roller element of a bearing, a fault in the holder of roller elements of a bearing, a mechanical resonance, a fault in teeth of a gearwheel, and a loose fit.

* * * * *